United States Patent Office 3,483,961
Patented Dec. 16, 1969

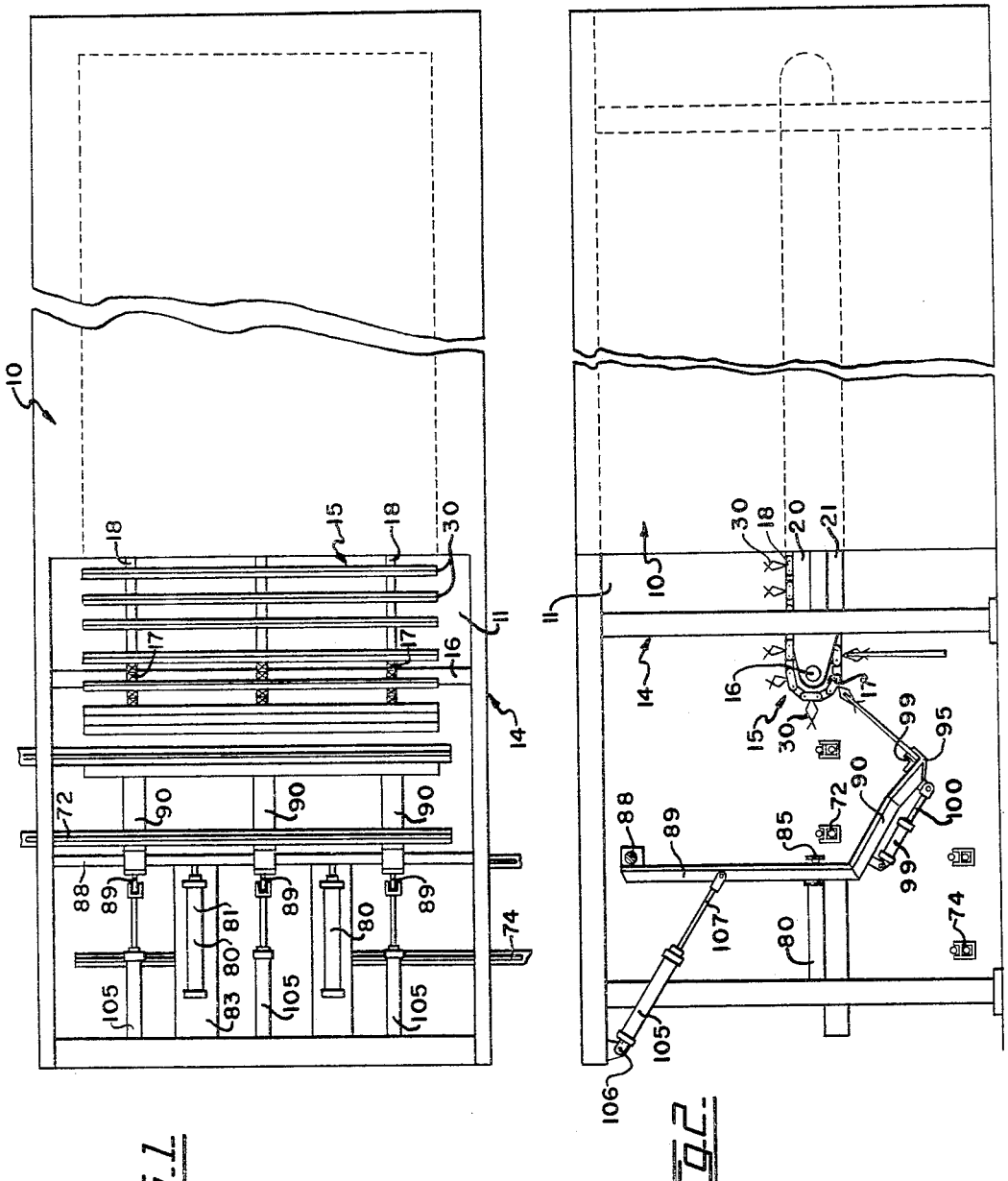
Dec. 16, 1969     E. J. GIRARD     3,483,961
SHINGLE DRYING APPARATUS
Filed Aug. 29, 1967     2 Sheets-Sheet 1
INVENTOR
ERNEST J. GIRARD

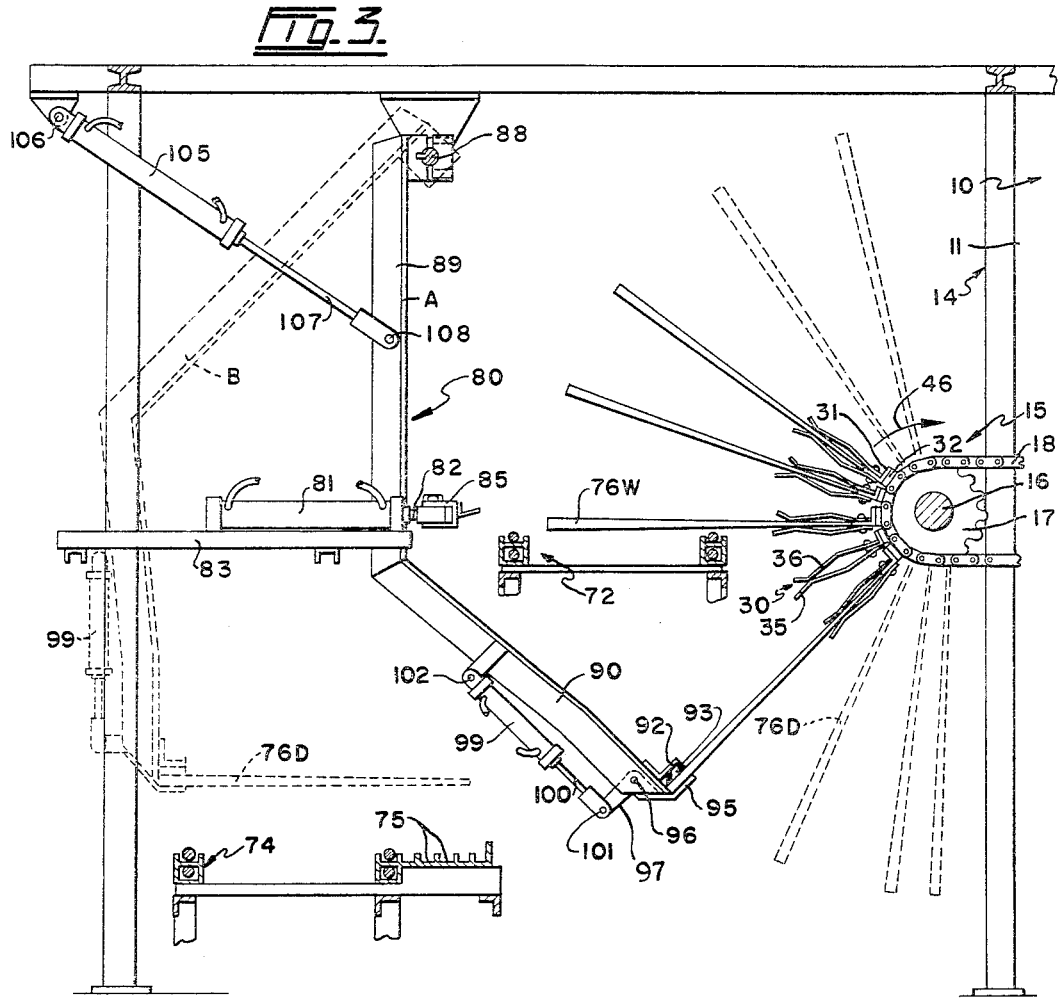
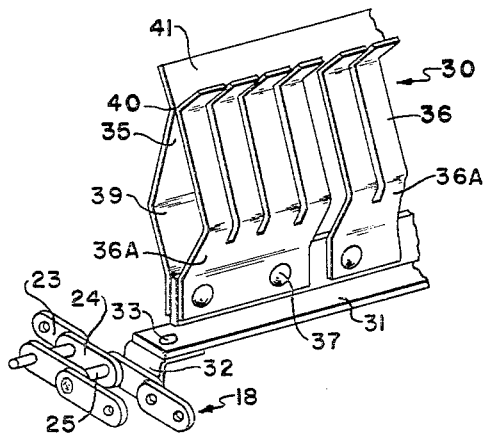
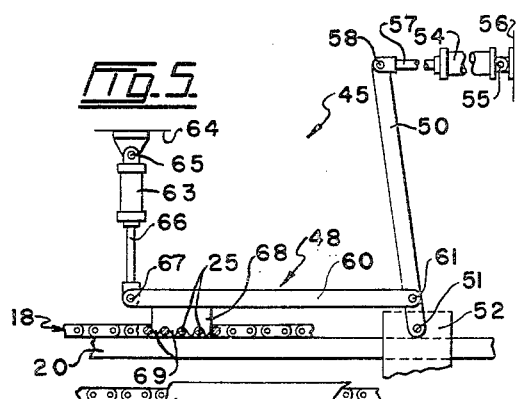

3,483,961
SHINGLE DRYING APPARATUS
Ernest J. Girard, West Vancouver, British Columbia,
Canada, assignor to North Shore Shingle Co. Ltd.,
Vancouver, British Columbia, Canada
Filed Aug. 29, 1967, Ser. No. 664,103
Int. Cl. B65g 47/04
U.S. Cl. 198—20                                  7 Claims

ABSTRACT OF THE DISCLOSURE

Apparatus having a conveyor equipped with carriers for supporting strips of sidewise arranged shingles with mechanism for loading and unloading the carriers and means for driving the conveyor intermittently to momentarily halt the carriers as they are loaded and unloaded.

BACKGROUND OF THE INVENTION

This invention relates generally to apparatus for handling panel-like articles during processing and more particularly to apparatus for handling shingles during a drying process.

In the manufacture of cedar shingles, freshly cut shingles conventionally are packed into bundles before being dried. The packaging is done by hand labor, the shingles being lifted individually from a bin into which they are dumped after they are cut from a block, and then being stacked into packing frames until a bundle of a desired size is accumulated. The bundle is then compressed and is bound by means of a wood banding unit. These bound or packaged bundles of shingles are manually loaded on to dry kiln cars which carry from 200 to 300 bundles and subsequently the loaded cars are wheeled into a dry kiln. After drying, which takes from 7 to 12 days, the bundles are removed from the dry kiln and are reopened for whatever further processing is required by the shingles. For example, the dried shingles normally are run through an edging machine which trims their side edges.

Such a tedious and time consuming method of drying shingles adds greatly to production costs and manufacturers have long been seeking apparatus which will eliminate the use of hand labor and the need for packaging the shingles before drying.

Attempts have been made to provide suitable equipment for handling shingles at this particular stage of production but hitherto such equipment has lacked the capacity to process large volumes of shingles. As a result, shingle manufacturers generally have rejected use of the equipment and have continued to use the conventional drying process in spite of its many disadvantages.

SUMMARY OF THE INVENTION

The present shingle drying apparatus contemplates a lengthy dry kiln conveyor equipped with a large number of carriers which can support long strips of shingles arranged in side-edge to side-edge relation. Automatically operating mechanism co-operates with continuously running delivery and discharge conveyors to load and unload the carriers and the dry kiln conveyor is driven intermittently to momentarily halt each carrier in the loading and unloading positions. Such apparatus is capable of handling shingles in sufficiently large volume as to make the drying of unpackaged shingles not only practical but advantageous. For example, each shingle is fully exposed to the heated air within the dry kiln which results in uniform drying and a reduction in drying time from the normal 7 to 12 days to as little as from 3 to 6 hours. Also, because of the improved air circulation, there is a reduction of the usual dry kiln defects such as: warpage, splits, and wet spots. Warpage is further reduced because the shingles are not subjected to the stresses encountered when they are packaged or stacked in tiers on the dry kiln cars. Thus, the dried shingles require very little in the way of trimming or further processing to remove defects all of which results in increased wood recovery. Since the apparatus can handle large amounts of shingles without the use of hand labor, productivity is increased and the operating costs of this particular phase of shingle manufacturing are reduced.

BRIEF DESCRIPTION OF THE DRAWINGS

FIGURE 1 is a schematic plan of the shingle drying apparatus, in accordance with the present invention, FIGURE 2 is a schematic side elevation of the apparatus, FIGURE 3 is a detail side elevation of the apparatus, with parts shown in section, FIGURE 4 is a fragmentary perspective view of a shingle carrier, and FIGURE 5 is a side elevation, with parts broken away, of a chain puller.

DESCRIPTION OF THE PREFERRED EMBODIMENT

The shingle drying apparatus includes a conventional dry kiln 10, the kiln in this particular instance being a suitably heated building of over 150 feet in length and having an open end 11.

Mounted in the kiln 10, is a frame 14 on which a conveyor 15 is supported, the conveyor projecting a short distance through the open end 11 of said kiln. Conveyor 15 has a suitable number of transverse shafts 16, one only shown, each shaft being fitted with two spaced sprockets 17. Trained over the sprockets 17, are two transversely spaced chains 18. The upper run of each chain 18 extends over a guide member 20 and the lower run of said chain is similarly disposed over a guide member 21, the guide members comprising part of the frame 14. As shown best in FIGURE 4, the conveyor chains 18 are made up of outer links 23 and inner links 24, the several links being cross connected by sprocket pins 25.

Mounted on the widely spaced chains 18, are a large number of shingle carriers which are generally indicated by the numeral 30 and are shown in detail in FIGURE 4. Each carrier 30 comprises a base bar 31 which is formed of a length of angle, the angle in this particular embodiment of the invention being some 6 feet long. The opposing outer links 23 of the chains 18 are fitted with brackets 32 and the base bars 31 are secured to these brackets by fasteners 33.

Each carrier 30 comprises a rigid trailing clamp 35 and a flexible leading clamp 36, both of said clamps being secured to the angle base bar 31 by means of rivets 37. Clamp 35 is a one piece structure formed of a substantially non-flexible strip of material which extends along the full length of the base bar 31 to which it is secured. In order to reduce weight, the leading clamp 36 is made up of a plurality of small rectangular plates 36A which are suitably spaced apart along the bar 31 with their overall length being equal to that of the clamp 35. The opposing clamps 35 and 36 are bent to provide each shingle carrier with an inner tapered socket 39, intermediate clamping ridges 40 and an outer throat 41 which is widely flared. Clamps 36 are tensioned to bear firmly against the rigid clamps 35 which are spaced at predetermined intervals around the circumference of the conveyor 15 and remain so spaced at all times during the operation of the apparatus.

It has been found that conventional drives are unsuitable for the conveyor 15; due to its extreme length, the heavy load it is required to carry, and the fact that lightweight chain is purposely used for this apparatus. Such chain permits a proportionately larger shingle load to be carried due, in part, to the chain pitch, (one inch in this embodiment) which permits close spacing of a vast number of shingle carriers. Also, the apparatus requires that coveyor chains be driven a selected distance and then halted for a predetermined interval to permit loading and unloading of the carriers 30. Conventional driving means, as well as associated parts, would have to be extremely powerful and heavy in order to take the load and the stresses incidental to the type of movement required. In addition, the slack motion of a large or heavy chain would make it virtually impossible to stop and start the conveyor with any degree of precision as must be done with shingle drying apparatus of this kind.

The present invention provides conveyor chain driving means, indicated generally by the numeral 45, which fulfills the above mentioned requirements and which drives the chains 18 intermittently in the direction of arrow 46 of FIGURE 3. In FIGURE 5, the means 45 is shown as comprising a chain puller 48. Preferably, six such chain pullers are used, there being one on a top run of each chain 18, and two others on the lower run of said chain. It will be noted, the chain pullers are spaced apart at suitable intervals on the chains 18, for example, at 100 foot intervals assuming the conveyor 15 is 150 feet long. Since the pullers 48 are similarly constructed, only one will be described in detail.

Referring to FIGURE 5, each chain puller 48 will be seen to be provided with an upwardly extending lever 50 which is secured by a pivot pin 51 to a bracket 52 carried by the guide members 20 and 21 of the conveyor frame. An air cylinder 54 is pivotally secured as at 55 to a frame part 56, the piston rod 57 of said cylinder being connected by a pivot pin 58 to the upper end of the lever 50. Near the pin 51, a horizontal arm 60 is secured to the lever 50 by a pivot pin 61. Above the outer end of the arm 60, a small air cylinder 63 is secured to a frame part 64 by a pivot pin 65. The piston rod 66 of cylinder 63 is secured to the arm 60 by a pivot pin 67. Arm 60 is fitted, near the pin 67, with a depending plate 68 and the lower edge of this plate is provided with sprocket teeth 69. Plate 68 is centered over an adjacent chain 18 with the teeth 69 being spaced apart to conform with the spacing of the chain pins 25.

The double acting air cylinders 54 and 63 are connected by a pneumatic circuit to a source of air pressure, the circuit including automatically operated control valves which simultaneously pressurize opposite ends of said cylinders at appropriate intervals to operate the several chain puller 48 in unison. Since such control circuits and the elements therein are well known, they are not illustrated in the drawings and further description is believed unnecessary.

The rods 57 of cylinders 54 are adapted to be retracted through power strokes and extended through return strokes. During the power strokes, rods 66 of cylinders 63 are fully extended to hold the toothed plates 68 in driving engagement with the chains 18. At the end of the power strokes, rods 66 are retracted to raise the plates 68 out of engagement with the chains, whereupon the piston rods 57 are extended through the return strokes. Thus, the chain pullers 48 operate to move the shingle carriers 30 a predetermined distance with each power stroke. The length of each power stroke is proportionate to the spacing between the shingle carriers 30 and, at the end of each power stroke, one of said carriers is horizontally aligned with the top of a delivery conveyor 72.

Conveyor 72, see particularly FIGURE 3, is mounted in the frame 14 to extend across the open end 11 of the dry kiln in spaced and parallel relation to the outermost shaft 16, the top surface of said conveyor being disposed slightly below the longitudinal axis of said shaft. A discharge conveyor 74 is mounted below and slightly to one side of the delivery conveyor. The delivery and discharge conveyors 72 and 74 are parallel to one another and their ends overlap in front of the drying kiln. The overlapping or shingle receiving end of the discharge conveyor 74 is provided with a number of parallel alignment bars 75, the bars being formed of lengths of angle. Suitable mechanism, not shown, is provided for placing wet shingles 76W on the receiving end of the conveyor 72 with their side edges in contact with one another or nearly so, and with their butt ends disposed on the left and their tips on the right of the delivery conveyor as viewed in FIGURE 3. Conveyor 74 receives dried shingles 76D which are arranged in the same manner and both the delivery and discharge conveyors are driven continuously by suitable means, not shown, when the apparatus is in operation.

Means, generally indicated by the numeral 80, is provided to transfer shingles from conveyor 72 to conveyor 15 thence to conveyor 74. As shown in detail in FIGURE 3, the means 80 comprises two transversely spaced double acting air cylinders 81 having piston rods 82, the cylinders being mounted on frame parts 83 to the left of the delivery conveyor 72. The rods 82 are connected by a pusher bar 85, the bar being some 6 feet in length and disposed slightly above the shingle supporting top surface of the delivery conveyor 72.

Journailed in the frame 14 above the pusher bar 85, is a transverse shaft 88 and secured to this shaft are three downwardly extending arms 89 having inwardly projecting lower ends 90. A jaw 92, formed of a length of angle which is fitted with a rubber pad 93, connects the lower ends of the portions 90. A hinge jaw 95 is secured to the portion 90 by a shaft 96, the shaft having three downwardly extending cranks 97. Each of the three portions 90 is fitted with a double acting air cylinder 99 having a piston rod 100, the rod being connected to an adjacent crank 97 by a pivot pin 101, and the air cylinder being similarly connected to the portion 90 by a pivot pin 102. The arms 89 are adapted to be swung in unison, between the solid line position A and the dotted line position B of FIGURE 3, by means of three double acting air cylinder 105. Cylinders 105 are secured to a part of the frame 14 by pivot pins 106 and piston rods 107 are similarly secured to the arms 89 by pivot pins 108. When the cylinders 105 swing the arms 89 from position B to position A and back to position B, the jaws 92 and 95 are moved through an interception stroke and a withdrawal stroke.

The cylinders 81, 99 and 105 are connected by suitable circuits, not shown, to a source of air pressure, the circuits including automatically operated valves which will operate these parts in properly timed relation to the operation of the chain pullers 48 driving the conveyor 15. Such pneumatic control devices are well known and, for the sake of brevity, detailed description of these devices has purposely been omitted.

As previously mentioned, the conveyor 15 is operated intermittently and the conveyors 72 and 74 are driven continuously to deliver wet shingles to the dryer and remove dried shingles therefrom. When a shingle carrier 30 is horizontally aligned with the top of the conveyor 72, cylinders 81 are pressurized to push a 6 foot strip of shingles 76W off said delivery conveyor towards conveyor 15. This movement thrusts the tips of the shingles into the throat 41 whereupon the clamping ridges 40 are forced apart and the shingle tips are lodged in the tapered socket 39. When the shingles of the strip are tightly gripped by the carrier 30 in this manner they cannot readily be withdrawn without the exertion of some force. Movement of the conveyor 15 raises this 6 foot strip of shingles off the conveyor 72, the conveyor movement taking place immediately after the pusher bar 85 is withdrawn. Once bar 85 is withdrawn, conveyor 72 moves another batch of shingles into loading position during which time conveyor 15 places the next following shingle carrier in alignment with the top of the delivery conveyor and, as this occurs, the cylinders 81 are again pressurized to push another 6 foot strip of shingles into the next aligned carrier. Thus, each carrier in turn is loaded with shingles until all the carriers are so loaded. As the shingles pass through the drier 10, warm air can circulate over the entire surface of each shingle. Thus, the shingles are thoroughly dried and eventually appear beneath the outermost shaft 16. As the first loaded carrier starts to swing upwardly beneath the shaft 16, the cylinders 105 are pressurized to swing the arms 89 from the dotted line position B to the solid line position A. This movement moves the jaws 92 and 95 into a position to intercept the shingles 76D and, as this occurs, cylinders 99 are pressurized to open said jaws. The butt end of the 6 foot strip of shingles in the first carrier loaded are swung into contact with the rubber pad 91, whereupon the jaws are closed by the cylinders 99 to grip the dried shingles. The arms 89 are then swung from position A back to position B, which movement withdraws the jaws, thus pulling the tips of the shingles out of the first loaded carrier 30 and placing said tips over the alignment bars 75. The cylinders 99 are then pressurized to open the jaws 92 and 95 and this allows the 6 foot strip of shingles to drop on to the conveyor with the bars 75 serving to keep the shingles at 90 degrees to the longitudinal axis of the discharge conveyor.

In this manner, the loading and unloading of the shingle carriers 30 of the dry kiln conveyor is done automatically. Since the conveyor 15 is fitted with a large number of shingle carriers 30, and each carrier is capable of being loaded with a 6 foot strip of shingles, the present apparatus can load and unload large quantities of shingles, the conveyor 72 and 74 can run continuously and at a fairly high rate of speed to deliver shingles to the apparatus and to discharge them therefrom.

It will be understood the air valves controlling the several air cylinders of the chain pullers and the shingle loading and unloading mechanism are electrically controlled by suitable means, not shown. Such means includes an electric circuit having limit switches and the like, actuated by appropriate moving parts, to operate the cylinders through their control valves in properly timed relation to one another so that all the movements of the apparatus are performed automatically and at high speed to ensure a very high output of dried shingles.

An important feature of the apparatus is the manner in which the large number of shingles are supported as they move through the dry kiln. The surfaces of the shingles are fully exposed to warm air circulation within the drier with the result that the shingles are thoroughly dried in a very short time and without the usual ill effects of rapid drying, such as warping and splitting etc. Optimum use is made of the drying space available so that the dry kiln is more economical to operate with this apparatus than with conventional equipment and methods of handling the shingles.

What I claim is:

1. Shingle drying apparatus comprising a dry kiln conveyor, a plurality of shingle carriers extending transversely of the dry kiln conveyor, a delivery conveyor adapted to advance shingles across one end of the dry kiln conveyor in side-edge to side-edge relation, means for driving the dry kiln conveyor intermittently to dispose each carrier in turn in alignment with the shingles on the delivery conveyor, means for loading a strip of shingles on the delivery conveyor tip first into each carrier, said loading means including an elongated pusher bar supported adjacent the butt ends of the shingles on the delivery conveyor, means for reciprocating the pusher bar through a feed stroke and a return stroke as each shingle carrier is moved into alignment with the shingles on the delivery conveyor, means for unloading a strip of shingles butt first from each carrier, said unloading means including a pair of elongated jaws, means for moving the pair of jaws through an interception stroke and a withdrawal stroke, said pair of jaws at the end of the interception stroke being disposed in the path of travel of the butt ends of the strip of shingles in each shingle carrier, and means for closing and opening the pair of jaws at the ends of the interception and withdrawal strokes respectively.

2. Shingle drying apparatus as claimed in claim 1, and including a discharge conveyor adapted to receive shingles from the pair of jaws at the end of the withdrawal stroke, said discharge conveyor having alignment bars extending parallel to one side thereof and adapted to be engaged by the shingle tips subsequent to the opening of the pair of jaws.

3. Shingle drying apparatus as claimed in claim 1, in which said driving means for the dry kiln conveyor is adapted to engage a conveyor chain supported for movement along a conveyor frame and comprises a lever extending substantially perpendicular to the conveyor chain, said lever having one end pivotally secured to the conveyor frame near the conveyor chain and an opposite end, an arm extending substantially parallel to the conveyor chain, said arm having an inner end pivotally secured to the lever adjacent said one end thereof and an outer end, a toothed plate carried by the outer end of the arm, means connected to the opposite end of the lever for rocking said lever to move the toothed plate through a power stroke and return stroke, and means connected to the outer end of the arm for rocking said arm to move the toothed plate into and out of driving engagement with the conveyor chain at the start of the power and return strokes respectively.

4. Shingle drying apparatus comprising a dry kiln conveyor having a frame, an endless conveyor chain mounted near each side of the frame, a plurality of shingle carriers mounted on the conveyor chains and extending across the frame, a delivery conveyor adapted to advance shingles across one end of the dry kiln conveyor in side-edge to side-edge relation, means for driving the dry kiln conveyor intermittently to dispose each shingle carrier in turn in alignment with the shingles on the delivery conveyor, a pusher bar supported alongside the delivery conveyor, means for reciprocating the pusher bar to thrust a strip of shingles off the delivery conveyor tip first into a shingle carrier as said carrier is aligned momentarily with said delivery conveyor, transversely spaced arms swingingly mounted in the frame near the delivery conveyor and having lower ends, a pair of jaws carried by the lower ends of the arms, means for swinging the arms to move the pair of jaws to intercept the butt ends of shingles supported by a shingle carrier and subsequently to withdraw therefrom, and means for opening and closing the pair of jaws in timed relation to the swinging movement of the arms to grip the intercepted shingle butt ends and withdraw the shingles from a shingle carrier.

5. Shingle drying apparatus as claimed in claim 4, in which said shingle carriers each comprise a leading clamp and a trailing clamp, said leading clamp being formed of resilient material, said trailing clamp being formed of substantially rigid material, said leading and trailing clamps being bent to define an inner tapered socket, intermediate clamping ridges and an outer flared throat.

6. Shingle drying apparatus as claimed in claim 4, in which said means for driving the dry kiln conveyor comprises a chain puller for each conveyor chain, each chain puller including a lever extending substantially perpendicular to an adjacent conveyor chain, said lever having one end pivotally secured to the frame and an opposite end, a first fluid cylinder and piston rod therefor pivotally connecting the opposite end of the lever to the frame, an arm extending substantially parallel to said adjacent conveyor chain, said arm having an outer end and an inner end pivotally secured to the lever adjacent said one end thereof, a toothed plate carried by the outer end of the arm, a second fluid cylinder and piston rod therefor pivotally connecting the outer end of the arm to the frame, said first fluid cylinder being adapted to move the toothed plate through a power stroke and move the toothed plate into and out of driving engagement with the conveyor chain at the start of the power and return strokes respectively.

7. Shingle drying apparatus comprising a dry kiln conveyor having a frame, an endless conveyor chain mounted near each side of the frame, a plurality of shingle carriers mounted on the conveyor chain and extending across the frame, each of said shingle carriers including a fixed clamp and a movable clamp, resilient means biasing the movable clamp towards the fixed clamp, a delivery conveyor adapted to advance shingles across one end of the dry kiln conveyor in side-edge to side-edge relation, a chain puller for each conveyor chain, each chain puller including a lever extending substantially perpendicular to an adjacent conveyor chain, said lever having one end pivotally secured to the frame and an opposite end, a first fluid cylinder and piston rod therefor pivotally connecting the opposite end of the lever to the frame, an arm extending substantially parallel to said adjacent conveyor frame, said arm having an outer end and an inner end pivotally secured to the lever adjacent said one end thereof, a toothed plate carried by the outer end of the arm, a second fluid cylinder and piston rod therefor pivotally connecting the outer end of the arm to the frame, said first fluid cylinder being adapted to move the toothed plate through a power stroke and return stroke, said second fluid cylinder being adapted to move the toothed plate into and out of driving engagement with the conveyor chain at the start of the power and return strokes respectively, a pusher bar supported alongside the delivery conveyor, means for reciprocating the pusher bar to thrust a strip of shingles off the delivery conveyor tip first into a shingle carrier as said carrier is aligned momentarily with said delivery conveyor, transversely spaced arms swingedly mounted in the frame near the delivery conveyor and having lower ends, a pair of jaws carried by the lower ends of the arms, means for swinging the arms to move the pair of jaws to intercept the butt ends of shingles supported by a shingle carrier and subsequently to withdraw therefrom, and means for opening and closing the pair of jaws in timed relation to the swinging movement of the arms to grip the intercepted shingle butt ends and withdraw the shingles from a shingle carrier.

References Cited

UNITED STATES PATENTS

| 2,100,441 | 11/1937 | Greene | 34—208 |
| 2,122,047 | 6/1938 | Sauvage | 198—134 |
| 3,204,748 | 9/1965 | Soules | 198—179 |

FOREIGN PATENTS

| 996,567 | 6/1965 | Great Britain. |

RICHARD E. AEGERTER, Primary Examiner

U.S. Cl. X.R.

198—134, 179